United States Patent [19]

Shoji et al.

[11] Patent Number: 4,626,942
[45] Date of Patent: Dec. 2, 1986

[54] POWER-SAVING DATA TRANSFER APPARATUS WITH A FLEXIBLE MAGNETIC DISK OR THE LIKE

[75] Inventors: Makoto Shoji, Fussa; Hiroshi Tsuyuguchi, Tokyo; Shozo Toma, Kokubunji; Kazuhiro Hiraki, Mitaka; Tsutomu Morita, Musashino, all of Japan

[73] Assignee: Teac Corporation, Tokyo, Japan

[21] Appl. No.: 705,674

[22] Filed: Feb. 26, 1985

[30] Foreign Application Priority Data

Mar. 2, 1984 [JP] Japan .................................. 59-40128
Mar. 2, 1984 [JP] Japan .................................. 59-40129

[51] Int. Cl.$^4$ ...................... G11B 5/012; G11B 21/04; G11B 15/48
[52] U.S. Cl. ...................................... 360/97; 360/70; 360/74.6; 360/75
[58] Field of Search ..................... 360/97-99, 360/70, 74.6, 75, 86, 137

[56] References Cited

U.S. PATENT DOCUMENTS

| | | | |
|---|---|---|---|
| 4,089,029 | 5/1978 | Castrodale et al. | 360/99 |
| 4,445,155 | 4/1984 | Takahashi et al. | 360/99 |
| 4,563,712 | 1/1986 | Nishio et al. | 360/75 |

FOREIGN PATENT DOCUMENTS 53-140012 12/1978 Japan ..................................... 360/75
57-36473 2/1982 Japan .

Primary Examiner—John H. Wolff
Attorney, Agent, or Firm—Woodcock Washburn Kurtz Mackiewicz & Norris

[57] ABSTRACT

A data transfer apparatus is disclosed as exemplified by a floppy disk drive which has photoelectric sensors such as a TRACK ZERO sensor for sensing whether a transducer head or heads are in the "track zero" position on the floppy disk, and a FILE PROTECT sensor for sensing whether the disk is protected against erasure of any prerecorded data. In order to avoid waste of power, at least the TRACK ZERO sensor, preferably the FILE PROTECT sensor as well, has its light source such as an LED connected to a power supply via a power saving switch herein shown as a switching transistor. Connected to the base of the power saving transistor is a switch control circuit which causes conduction through the transistor, and hence the energization of the sensor light source, only when the operation of the sensor is required, as for a preassigned length of time immediately after the apparatus is electrically turned on.

15 Claims, 7 Drawing Figures

POWER-SAVING DATA TRANSFER APPARATUS WITH A FLEXIBLE MAGNETIC DISK OR THE LIKE

BACKGROUND OF THE INVENTION

Our invention relates to apparatus employing disklike record media for the recording and/or reproduction of data, and more specifically to apparatus for data transfer with flexible magnetic disks, now commonly referred to as floppy disks, although we do not wish our invention to be unnecessarily limited to this particular type of record medium. Still more specifically, our invention concerns a device known as a floppy disk drive (FDD) for data transfer to and from interchangeable floppy disks, featuring provisions for avoiding waste of power.

Floppy disks have found widespread acceptance in information processing and allied industries, as well as in offices and homes, as compact data storage media. Being thin and limply flexible, the disks are usually encased in more rigid, apertured envelopes to make up disk cartridges or cassettes that are self supporting. There have also been suggested and used a variety of FDDs for data transfer to and/or from such disk cartridges or cassettes. U.S. Pat. No. 4,089,029, issued May 9, 1978 to Castrodale et al. and assigned to International Business Machines Corp., represents a familiar example of floppy disk and FDD combination, and a different floppy disk and FDD combination has more recently been proposed by Sony Corp., as disclosed in Japanese Laid Open Patent Application No. 57-36473, laid open to public inspection on Feb. 27, 1982, and in corresponding U.S. Pat. No. 4,445,155 issued Apr. 24, 1984.

Usually, FDDs are not self contained; they are slave units under the control of master equipment typically comprising a central processor unit (CPU) and an associated FDD controller. Each FDD intended for use with such master equipment has no power switch of its own. In a data processing system comprising a CPU, an FDD controller, and one or more FDDs, for example, only one power switch serves the complete system.

A problem has existed with respect to the power consumption of such a data processing system. Power has conventionally been fed to and consumed by the various components of the FDD or FDDs upon closure of the system power switch. However, not all the FDD components need by powered at all times during the operation of the data processing system. Take, for example, the photoelectric sensors incorporated in each FDD. Although the outputs from the sensors are utilized for the purposes for which they are intended only for limited lengths of time during the operation of the data processing system, the light sources of the sensors have been held energized throughout the complete period of system operation. This of course has incurred a substantial waste of energy.

SUMMARY OF THE INVENTION

We object to that waste of energy due to the constant energization of a sensor or sensors in a data transfer apparatus of the kind defined and hereby proposes an improved apparatus that realizes a remarkable curtailment of power consumption in a simple and thoroughly practicable manner and without in any way sacrificing the normal operation of the apparatus.

Our invention may be broadly summarized as a data transfer apparatus for use with a disklike record medium such as a flexible magnetic disk having data storage tracks thereon, comprising a disk drive motor for imparting rotation to the record medium, a head transport motor for transporting a transducer head, or a pair of such heads, radially of the record medium to enable the transducer head or heads to access the individual data storage tracks on the record medium for data transfer therewith, and a sensor including a light source for sensing whether the transducer head or heads are in a preassigned track position on the record medium. Also included is a power saving switch connected between the light source of the sensor and the power supply means of the apparatus for allowing the latter to energize the former only when the operation of the sensor is required. A switch control circuit is connected to the power saving switch for the on/off control thereof, the switch control circuit being actuated at least when the data transfer apparatus is electrically turned on, for holding the power saving switch closed for a preassigned length of time thereafter.

The noted sensor is what is herein referred to as the TRACK ZERO sensor, functioning to ascertain whether the transducer head or heads are in the "track zero" position on the record medium. The TRACK ZERO sensor serves its purpose if its light source is energized at least for a certain limited length of time after the data transfer apparatus is electrically turned on.

In a preferred embodiment, not only the light source of the TRACK ZERO sensor but also that of a FILE PROTECT sensor, another standard component of this type of data transfer apparatus, is connected to the power supply means via the power saving switch. The two light sources are jointly energized and deenergized under the control of the switch control circuit during the operation of the data transfer apparatus. The switch control circuit may energize the light sources during additional periods, as upon loading of the record medium on the apparatus, upon rotation of the disk drive motor in response to a "motor on" signal, and upon return of the transducer head or heads to the "track zero" position on the record medium. The power consumption of the light sources can be drastically reduced as they are held deenergized during the other periods while the apparatus is in operation.

The above and other features and advantages of our invention and the manner of realizing them will become more apparent, and the invention itself will best be understood, from a study of the following description and appended claims, with reference had to the attached drawings showing the preferred embodiment of our invention.

DESCRIPTION OF THE PREFERRED EMBODIMENT

Figure 1:
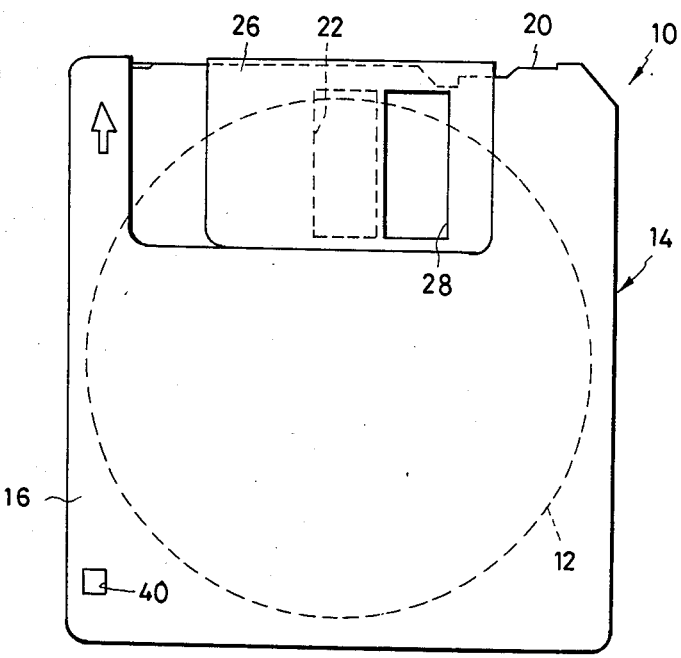
FIG. 1 is a top plan view of a flexible magnetic disk cassette suitable for use with the data transfer apparatus of our invention.

The data transfer apparatus in accordance with our invention is particularly well suited for use with the flexible magnetic disk cassette of the kind disclosed in the noted U.S. Pat. No. 4,445,155 and commonly known as a "microfloppy" disk. We will explain the construction of the representative disk cassette, illustrated in FIGS. 1 and 2 of the drawings attached hereto and therein generally designated 10, to an extent necessary for a full understanding of our invention. The exemplified disk cassette has a flexible magnetic disk 12 with a diameter of 86 millimeters, for example, that is housed in a protective envelope 14 of relatively rigid plastics material. The envelope 14 is of generally flat, approximately square boxlike shape, comprising a pair of opposite main sides 16 and 18 oriented parallel to the magnetic disk 12. The disk cassette 10 is to be loaded horizontally in the associated disk drive or data transfer apparatus, to be disclosed presently, with its side 16 directed upwardly and, as indicated by the arrow in FIG. 1, with its edge 20 foremost. We will therefore hereinafter refer to the side 16 as the top side, the other side 18 as the bottom side, and the edge 20 as the front edge.

Formed in both top 16 and bottom 18 sides of the envelope 14, in the vicinity of its front edge 20, are apertures 22 and 24 to expose radial portions of the opposite surfaces of the magnetic disk 12 for data transfer contact with a pair of transducer heads, yet to be set forth, of the data transfer apparatus. Normally, the apertures 22 and 24 are held closed by a sliding shutter 26 in the form of a sheet of aluminum, stainless steel or like material bent into the shape of a U to fit over the front edge 20 of the envelope 14. The shutter 26 has itself two apertures 28 and 30 which are out of register with the envelope apertures 22 and 24 when the shutter is in the normal or right hand position of FIGS. 1 and 2 under the bias of a spring (not shown). When the disk cassette 10 is loaded fully into the data transfer apparatus, the shutter 26 will be forced leftwardly by a shutter opening lever included in the apparatus against the bias of the unshown spring. Thereupon, as illustrated in FIG. 3, the shutter 26 will bring its apertures 28 and 30 into register with the envelope apertures 22 and 24, respectively, thereby exposing the radial portions of the opposite faces of the magnetic disk 12 for data transfer contact with the transducer heads of the data transfer apparatus 10.

Figure 2:
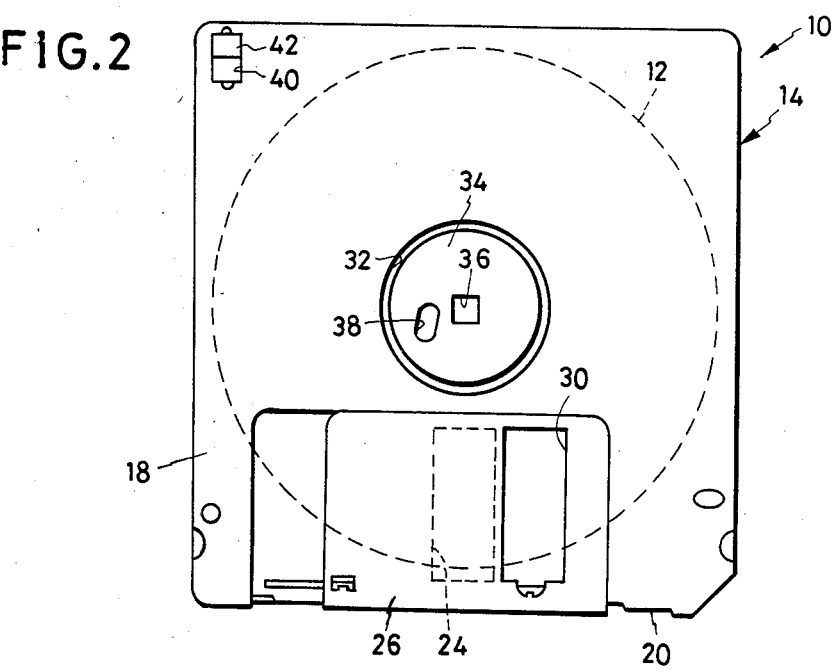
FIG. 2 is a bottom plan view of the disk cassette of FIG. 1.

The magnetic disk cassette 10 is to be placed upon the turntable of the data transfer apparatus with the top side 16 of its envelope 14 oriented upwardly. Thus, as seen in FIG. 2, the bottom side 18 of the envelope 14 has a circular opening 32 defined centrally therein to allow engagement of the magnetic disk 12 with the turntable. Exposed through the central opening 32 is a hub 34 in the form of a disk of ferromagnetic material attached centrally to the magnetic disk 12. The hub 34 has a square hole 36 defined centrally therein, and a short slot 38 defined eccentrically therein.

The envelope 14 of the disk cassette 10 has a FILE PROTECT window 40 defined therein at or adjacent one corner thereof. This window is either to be closed by a sliding shutter 42, or to be opened, depending upon whether the data that has been recorded on the magnetic disk 12 may be, or is not to be, erased. The FILE PROTECT window 40 allows radiant energy to pass therethrough only when opened.

Figure 3:
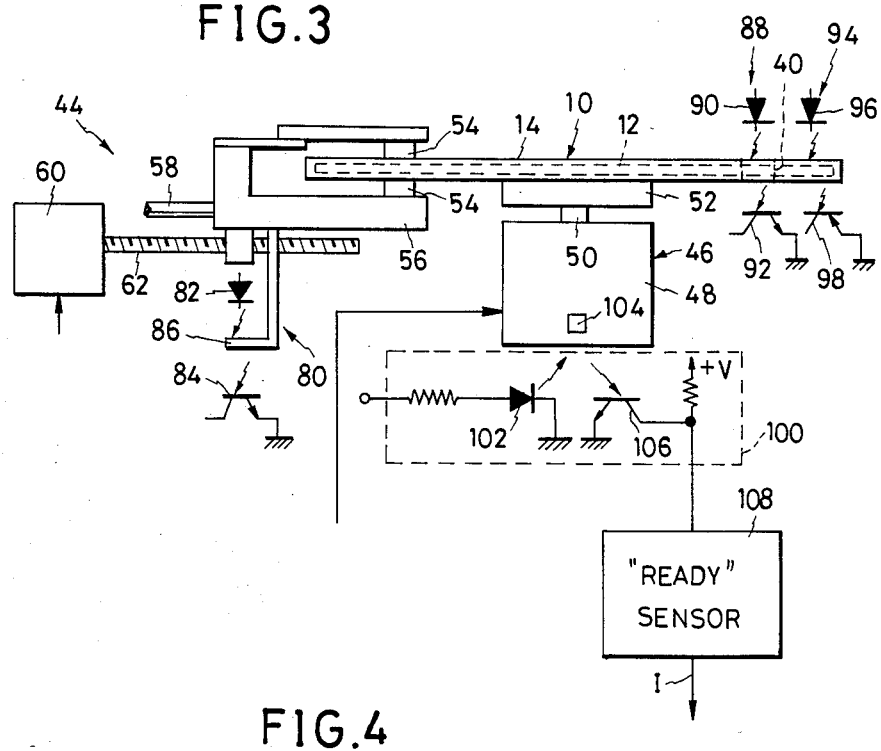
FIG. 3 is a partial, diagrammatic representation of an FDD for use with the disk cassette of FIGS. 1 and 2, shown together with the disk cassette mounted in position therein, the FDD being an example of data transfer apparatus in accordance with our invention.

We have illustrated in FIG. 3, both diagrammatically and as simply as possible, the general internal organization of an FDD 44, for use with the magnetic disk cassette 10 of FIGS. 1 and 2, in which there can be incorporated the novel concepts of our invention. The FDD 44 includes a disk drive motor 46 which in this particular embodiment is of the known rotor outside stator configuration; that is, the rotor 48 is arranged outside the stator, not seen, for joint rotation with a motor output shaft serving as a spindle 50 on which a turntable 52 is directly mounted in a coaxial relation thereto. Shown to have the magnetic disk cassette 10 mounted thereon, the turntable 52 has a permanent magnet, not shown, thereon for attracting the hub 34, FIG. 2, of the magnetic disk 12. The spindle 50 projects upwardly of the turntable 52 for engagement in the center hole 36 in the disk hub 34. A retractable, spring loaded drive pin, not shown, is arranged eccentrically on the turntable 52 for engagement in the eccentric slot 38 in the disk hub 34, in order to transmit the rotation of the turntable to the magnetic disk 12.

We understand that the magnetic disk 12 of the cassette 10 is double sided; that is, both of its opposite faces are used for data storage. Thus the FDD 44 is shown to have a pair of magnetic transducer heads 54 arranged for data transfer contact with the opposite faces of the magnetic disk 12 of the disk cassette 10 on the turntable 52 through the apertures 22 and 24 in its envelope 14 and through the apertures 28 and 30 in the sliding shutter 26. Only one transducer head might of course be provided if the magnetic disk for use were single sided. The pair of transducer heads 54 are mounted on a carriage 56 slidable along guide means 58, thereby to be transported radially of the magnetic disk 12 for accessing the individual data storage tracks thereon in the well known manner.

Employed for reciprocably and incrementally driving the carriage 56, carrying the transducer heads 54, is a head transport motor 60 of the well known stepping type capable of rotation in short and essentially uniform angular movements. The head transport motor 60 is coupled to the head carriage 56 via a lead screw 62. Any other suitable rotary to linear converter could of course be employed in lieu of the lead screw 62, examples being the familiar steel belt bent into the approximate shape of the Greek alpha, and a rack and pinion mechanism.

Figure 4:
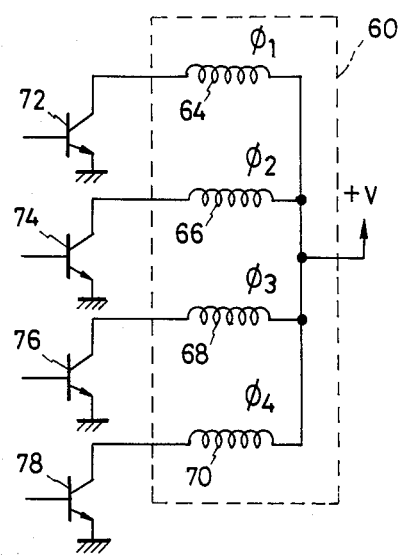
FIG. 4 is a schematic electrical diagram of the head transport motor in the FDD of FIG. 3, the motor being shown together with parts of an associated drive circuit.

As illustrated in FIG. 4, the head transport motor 60 is of four phase construction in this particular embodiment, comprising first 64, second 66, third 68 and fourth 70 phase windings. Although this figure shows only one winding for each phase, we understand that there are several interconnected windings for each phase. The windings 64, 66, 68 and 70 are connected to a common voltage source on the one hand and, on the other hand, to respective switching transistors 72, 74, 76 and 78. Normally, the switching transistors are to be sequentially or cyclically rendered conductive to cause excitation of the windings 64, 66, 68 and 70 in the single phase drive mode and hence to cause rotation of a rotor (not shown). Reference is directed to U.S. patent application Ser. No. 588,677, filed Mar. 12, 1984 now U.S Pat. No. 4,594,677 by M. Shoji et al. and assigned to the assignee of the instant application, for further details in the construction and operation of this head transport motor 60.

With reference back to FIG. 3 the reference numeral 80 generally denotes a TRACK ZERO sensor for photoelectrically sensing the predetermined "track zero" position of the transducer heads 54 on the magnetic disk 12. The TRACK ZERO sensor comprises a light source such as a light emitting diode (LED) 82, and a photodetector such as a phototransistor 84. The LED 82 and phototransistor 84 are both disposed in fixed positions and opposite each other. The light energy from the LED 82 impinges on the phototransistor 84 when the transducer heads 54 are in other than the "track zero" position on the magnetic disk 12 on the turntable 52. When the transducer heads reach the "track zero" position, then, an interrupter 86 depending from the head carriage 56 prevents the LED 82 from irradiating the phototransistor 84.

A FILE PROTECT sensor 88 likewise comprises a light source such as an LED 90 and a photodetector such as a phototransistor 92, which are fixedly mounted opposite each other across the disk cassette 10 on the turntable 52. The LED 90 irradiates the phototransistor 92 if the disk cassette 10, mounted in place on the turntable 52, has its FILE PROTECT window 40 uncovered by the shutter 42.

A disk detector 94 also comprises a light source such as an LED 96 and a photodetector such as a phototransistor 98, which are fixedly mounted opposite each other across the disk cassette 10 on the turntable 52. On being loaded in the FDD 44, the disk cassette 10 intercepts the light emitted by the LED 96 and so prevents the light from falling on the phototransistor 98.

A revolution sensor 100 also comprises a light source such as an LED 102 for throwing light onto a reflector 104 on the rotor 48 of the disk drive motor 46, and a photodetector such as a phototransistor 106 to be irradiated by the light that has been reflected by the reflector 104. The rotor 48 of the disk drive motor 46 rotates with the magnetic disk 12 in a predetermined angular relationship thereto, so that the revolution sensor 100 of the above arrangement makes it possible to ascertain the revolving speed of the magnetic disk 12 as well as its angular position on the turntable 52.

The phototransistor 106 of the revolution sensor 100 is connected to a "ready" sensor circuit 108 which puts out a "ready" signal indicative of the fact that the magnetic disk 12 is ready for data transfer. The magnetic disk becomes ready for data transfer upon lapse of a preset length of time, typically 420 milliseconds (ms), from the moment the disk drive motor 46 is set into rotation, provided that the rotative speed of the disk at that time is not less than 90 percent of the normal speed.

Figure 5:
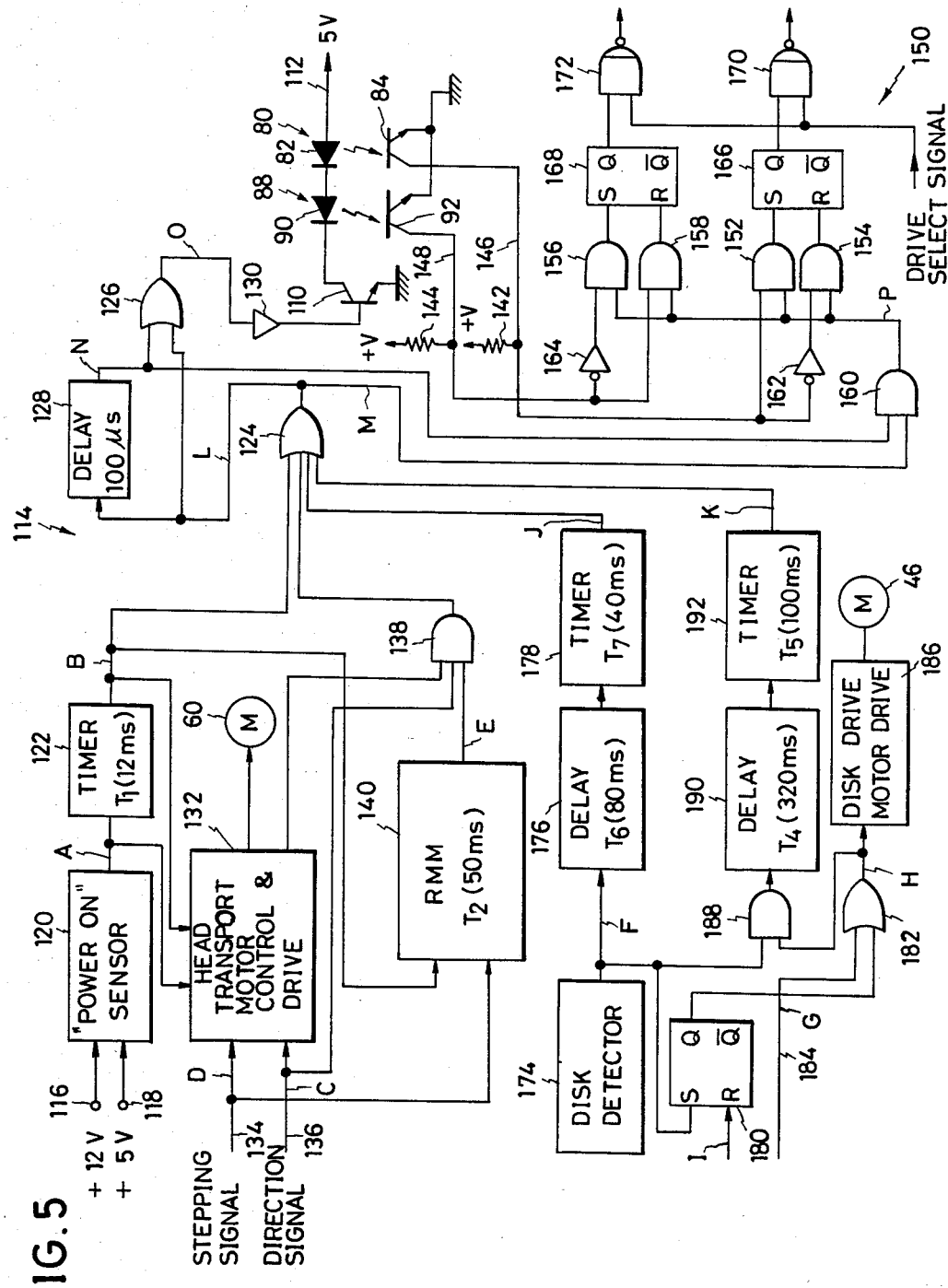
FIG. 5 is a block diagram of the electric circuitry of the FDD of FIG. 3, embodying the novel concepts of our invention.

We have drawn in FIG. 5 the electric circuitry of the FDD 44 embodying the novel concepts of our invention. First to be noted from the showing of FIG. 5 is the fact that the LED 82 of the TRACK ZERO sensor 80 and the LED 90 of the FILE PROTECT sensor 88 are connected to the supply circuit of the FDD 44 via a power saving switch herein shown as a switching transistor 110 of the npn type constituting a feature of our invention. We will refer to this transistor as the power saving transistor hereafter. The two LEDs 82 and 90 are connected in series with each other. The anode of the TRACK ZERO sensor LED 82 is connected to a five volt supply line 112, and its cathode is connected to the anode of the FILE PROTECT sensor LED 90, whose cathode is grounded via the power saving transistor 110. The LEDs 82 and 90 are therefore energized with the five volt supply voltage only during the conducting periods of the power saving transistor 110.

Employed for the automatic on/off control of the power saving transistor 110 is a switch control circuit generally labeled 114 in FIG. 5. In the following description of this switch control circuit 114 we will refer also to the waveforms designated (A) through (L) in FIG. 6 and (M) through (P) in FIG. 7. We have indicated in FIG. 5 the lines where the waveforms (A) through (P) appear, by the same capitals.

As has been mentioned, the FDD 44 is normally connected to and controlled by master equipment to provide a complete data processing system. The data processing system may have two separate power supplies, one of 12 volts and another of five volts, as we have assumed here. At 116 and 118 in FIG. 5 are shown a 12 volt supply terminal and a five volt supply terminal, respectively, both connected to a "power on" sensor circuit 120. The output from this "power on" sensor circuit goes high when, following the closure of the power switch (not shown) of the data processing system, the 12 and five volt supply voltages both build up to, say, 70 to 80 percent of their respective maximum values. The "power on" sensor circuit output is shown to go high at a moment t1 at (A) in FIG. 6.

The output of the "power on" sensor circuit 120 is connected to a timer 122, which puts out a pulse of a predetermined duration T1 (e.g. 120 ms) when the "power on" sensor circuit output goes high. The output from the timer 122 is given at (B) in FIG. 6.

The output of the timer 122 is connected to a four input OR gate 124, whose output is connected to a two input OR gate 126 on one hand and, on the other hand, to a 100 microsecond delay circuit 128. The output of this delay circuit is connected to the other input of the OR gate 126. The output of the OR gate 126 is connected via an amplifier 130 to the base of the power saving transistor 110. Accordingly, as the output from the timer 122 goes high from moment t1 to moment t2 as at (B) in FIG. 6, so does the output from the OR gate 124 as at (L) in FIG. 6, causing conduction through the power saving transistor 110 during that period.

The output of the "power on" sensor circuit 120 and that of the timer 122 are both connected further to a head transport motor control and drive circuit 132, which in turn is connected to the head transport motor 60 for driving the same in a controlled manner. Also connected to this circuit 132 are two input lines 134 and 136 for receiving from the unshown master equipment a STEPPING signal and a STEPPING DIRECTION signal depicted at (C) and (D) in FIG. 6. The STEPPING signal dictates the extent (the number of tracks on the magnetic disk 12) to which the pair of transducer heads 54 are to be transported. The STEPPING DIRECTION signal, on the other hand, determines the direction in which the transducer heads 54 are to be moved, that is, either radially inward or radially outward. The control and drive circuit 132 responds to these input signals by actuating the four switching transistors 72, 74, 76 and 78, FIG. 4, included therein, in the single phase drive mode.

The head transport motor control and drive circuit 132 is further equipped to cause conduction through the first phase switching transistor 72 in response to the high output from the "power on" sensor circuit 120. One of the first phase windings 64, FIG. 4, of the head transport motor 60 correspond to the "track zero" position of the transducer heads 54 on the magnetic disk 12 in this FDD. The excitation of the first phase windings 64 upon closure of the unshown power switch of the data processing system makes it possible to positively hold the transducer heads 54 in the "track zero" position. If the output from the TRACK ZERO sensor 80 indicates that the transducer heads 54 are not in the "track zero" position, the unshown master equipment will deliver to the control and drive circuit 132 the required number of stepping pulses for returning the transducer heads to that position.

The TRACK ZERO sensor 80 of the above described construction has sensing errors, however, which may amount to two tracks. Its output may therefore indicate that the transducer heads 54 are in the "track zero" position when actually they are in a "track one" or "track two" position. If the rotor (not shown) of the head transport motor 60 lies opposite the second phase windings 66, with the transducer heads 54 in the "track one" position on the magnetic disk 12, the excitation of the first phase windings 64 upon closure of the unshown system power switch will result in the return of the transducer heads to the "track zero" position. However, when the rotor lies opposite the third phase windings 68, it will remain locked in that position if only the first phase windings 64 were energized.

It is to prevent such locking of the head transport motor 60 that the timer 122 is connected to the control and drive circuit 132. In response to the output pulse of the timer 122, the control and drive circuit 132 operates to cause excitation of the second phase windings 66 of the head transport motor 60. The rotor of this motor will then not lock up if it has been held opposite the third phase windings 68. Alternatively, such locking of the head transport motor may be prevented by exciting its first and third, or first and fourth, phase windings during the period from moment t1 to moment t2. It is also possible to start the excitation of the first phase windings 64 at the moment t2. For further details in such operation of the head transport motor 60, reference may be had to the aforesaid Shoji et al. U.S. patent application Ser. No. 588,677.

The control and drive circuit 132 has another output connected to a three input AND gate 138 for the delivery thereto of the same signal as that to cause conduction through the first phase switching transistor 72 of FIG. 4. Connected to the other two inputs of the AND gate 138 are the STEPPING DIRECTION signal input line 136 and a retriggerable monostable multivibrator (RMM) 140.

The RMM 140 has two inputs, one connected to the timer 122 and the other connected to the STEPPING signal input line 134. Triggered at the moment t2 by the trailing edge of the output pulse of the timer 122, shown at (B) in FIG. 6, the RMM 140 puts out a pulse of a prescribed duration T2 (e.g. 50 ms) from moment t2 to moment t3 as at (E) in FIG. 6. Further, as the unshown master equipment produces a series of consecutive stepping pulses from moment t13 to moment t14, as at (D) in FIG. 6, the RMM 140 is triggered by each of these stepping pulses, producing a high output from moment t13 to moment t15. The recurrence rate of each series of stepping pulses is such that the output from the RMM remains high during the production of the series of pulses. Further, retriggered by the last pulse, the RMM 140 continues the production of a high output for 50 ms from the moment t14 when the last pulse disappears.

As we have stated, the head transport motor control and drive circuit 132 puts out the first phase excitation signal upon closure of the unknown system power switch. Further the master equipment supplies the STEPPING DIRECTION signal, as at (C) in FIG. 6, which signal is high for causing the travel of the transducer heads 54 radially outwardly of the magnetic disk 12 toward the "track zero" position thereon. Still further the RMM 140 puts out the pulse of (E) in FIG. 6, from moment t2 to moment t3, by being triggered by the output from the timer 122. All the three inputs to the AND gate 138 are therefore high from moment t2 to moment t3. The resulting high output from the AND gate 138 causes the output from the OR gate 124 to go high during that period, as at (L) in FIG. 6, with the consequent conduction through the power saving transistor 110.

Thus, upon closure of the system power switch, the switch control circuit 114 electrically connects two LEDs 82 and 90 of the TRACK ZERO sensor 80 and FILE PROTECT sensor 88 to the five volt supply voltage for a period of T3 (T1+T2=62 ms) from moment t1 to moment t3, making possible the functioning of these sensors 80 and 88. (In this particular embodiment, however, the delay circuit 128 coacts with the OR gate 126 to slightly extend the period of the energization of the LEDs 82 and 90, as will be later explained in more detail.) The energization of the LEDs 82 and 90 during this period is necessary at least for the detection of the "track zero" position of the transducer heads 54 by the TRACK ZERO sensor 80. The energization of the FILE PROTECT sensor LED 90 during this period may serve no useful purpose, however, since the disk cassette 10 may not yet be loaded in the FDD 44, as we have assumed in drawing the waveforms of FIG. 6. More will be said presently on this subject.

The phototransistors 84 and 92 of the TRACK ZERO sensor 80 and FILE PROTECT sensor 88 have both their emitters grounded and their collectors connected to a positive biasing voltage source +V via resistors 142 and 144, respectively. The collector lines 146 and 148 of the phototransistors 84 and 92 go low only when they are irradiated by the respective LEDs 82 and 90. The collector line 146 of the TRACK ZERO sensor phototransistor 84 goes high when, with the transducer heads 54 in the "track zero" position, the interrupter 86 intervenes between LED 82 and phototransistor 84. The fact that the transducer heads 54 are in the "track zero" position can therefore be ascertained from the high state of the collector line 146 of the TRACK ZERO sensor phototransistor 84 despite the energization of the TRACK ZERO sensor LED 82.

Let us suppose that the disk cassette 10 has been loaded in the FDD 44 when the power switch of the data processing system is closed, and that its FILE PROTECT window 40, FIG. 2, is not closed by the shutter 42. Then the energization of the FILE PROTECT sensor LED 90 will result in the irradiation of the associated phototransistor 92 through the FILE PROTECT window 40. The corresponding low output from the FILE PROTECT sensor phototransistor 92 indicates that the data contained in that disk cassette 10 are not to be erased.

As may have been seem from the foregoing, the outputs from the TRACK ZERO sensor 80 and FILE PROTECT sensor 88 bear validity only during the energization of their LEDs 82 and 90. The two sensor outputs are therefore both directed into a sensor output validation circuit generally referenced 150. The sensor output validation circuit 150 comprises five AND gates 152, 154, 156, 158 and 160, two NOT circuits 162 and 164, and two RS flip flops 166 and 168.

The AND gate 152 of the sensor output validation circuit 150 has a first input connected to the collector line 146 of the TRACK ZERO sensor phototransistor 84, and a second input connected to the AND gate 160. This AND gate 160 has a first input connected to the delay circuit 128, and a second input connected to the OR gate 124. We have mentioned in connection with (L) in FIG. 6 that the output from the OR gate 124 is high from moment t1 to moment t3. The high state of this OR gate output is depicted also at (M) in FIG. 7. Then, as shown at (N) in FIG. 7, the output from the delay circuit 128 will be high from moment t1', 100 microseconds after the moment t1, to moment t3', 100 microseconds after the moment t3. Receiving these outputs from OR gate 124 and delay circuit 128, the AND gate 160 will produce a high output from moment t1' to moment t3, as at (P) in FIG. 7. The same outputs from OR gate 124 and delay circuit 128 are delivered to the OR gate 126, causing the same to produce a high output from moment t1 to moment t3', as at (O) in FIG. 7.

Accordingly, while the LEDs 82 and 90 are held electrically connected to the five volt power supply from moment t1 to moment t3', the output from the AND gate 160 is high during a shorter period of moment t1' to moment t3. The delayed moment t1' is when the LEDs 82 and 90 start sending forth their full radiant energy, making possible the accurate TRACK ZERO and FILE PROTECT sensings.

If the output from the TRACK ZERO sensor 80 is high throughout the period from moment t1 to moment t3, the AND gate 59 will produce a high output, indicative of the fact that the transducer heads 54 are in the "track zero" position, only from moment t1' to moment t3. The high output from the AND gate 152 is impressed to the "set" input S of the flip flop 166 for setting the same. If the FDD 44 is connected to the master equipment in parallel with one or more other FDDs, the corresponding high output from the flip flop 166 is delivered to a two input NAND gate 170. Applied to the other input of the NAND gate 170 is the standard DRIVE SELECT signal supplied from the master equipment for the selective use of the FDDs. Therefore, only when the DRIVE SELECT input signal to this particular FDD 44 is high, the NAND gate 170 produces a low output corresponding to the high output from the flip flop 166, for delivery to the master equipment.

The output from the AND gate 160 is low when the TRACK ZERO sensor LED 82 is unenergized. Consequently, the output from the AND gate 152 remains low if the output from the TRACK ZERO sensor 80 is high.

Connected to the "reset" input R of the flip flop 166 is the AND gate 154 which has its two inputs connected to the AND gate 160 and, via the NOT circuit 162, to the TRACK ZERO sensor 80. The output from the AND gate 154 goes high, therefore, when the output from the AND gate 160 is high and, at the same time, when the output from the TRACK ZERO sensor 80 is low. The high output from the AND gate 154 resets the flip flop 166. It is thus seen that the flip flop 166 is reset if the transducer heads 54 are in other than the "track zero" position when the TRACK ZERO sensor LED 82 is being energized.

The AND gate 156 of the sensor output validation circuit 150 has a first input connected to the FILE PROTECT sensor 88 via the NOT circuit 164, and a second input connected to the AND gate 160. Accordingly, if the output from the FILE PROTECT sensor 88 is low when its LED 90 is being energized, the AND gate 156 provides a high output indicative of the fact that the data that has been written on the magnetic disk 12 of the cassette 10 loaded in the FDD 44 must be protected against erasure. The AND gate 156 has its output connected to the "set" input S of the flip flop 168, so that the high output from the AND gate 156 sets the flip flop 168. The output from the AND gate 160 is low, as aforesaid, during the nonenergization of the FILE PROTECT sensor LED 90. During this period, therefore, the output from the AND gate 156 remains low, invalidating the low output from the FILE PROTECT sensor 88.

The flip flop 168 when set delivers a high output from its "Q" terminal to a NAND gate 172, to which is also supplied the DRIVE SELECT signal from the master equipment. When the DRIVE SELECT signal is high, the NAND gate 172 responds to the high output from the flip flop 168 by delivering to the master equipment a low output corresponding to the low output from the FILE PROTECT sensor 88.

Connected to the "reset" input R of the flip flop 168, the AND gate 158 has a first input connected to the FILE PROTECT sensor 88 and a second input connected to the AND gate 160. The AND gate 158 resets the flip flop 168 when both of its inputs go high.

Figure 6:
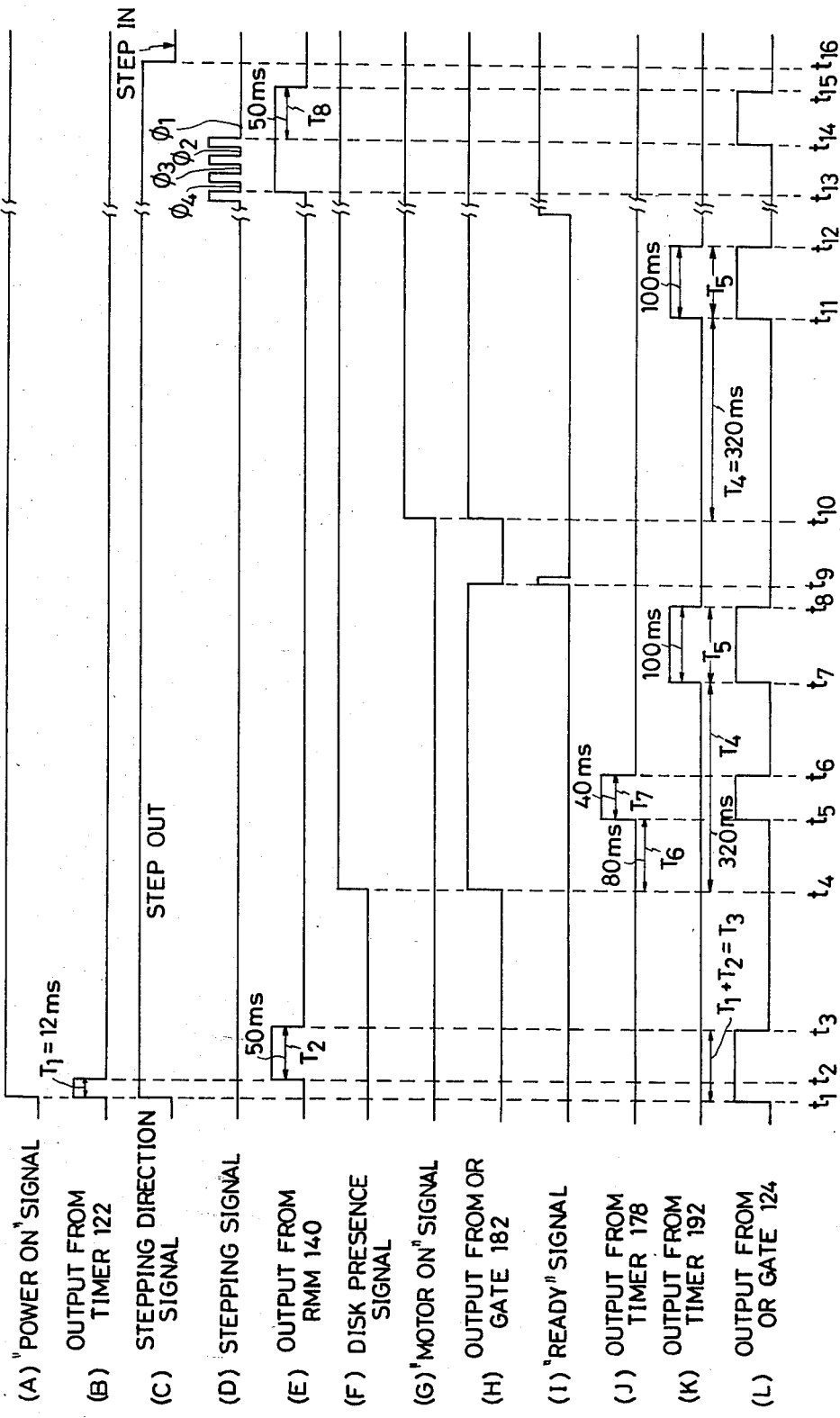
FIG. 6 is a waveform diagram useful in explaining the operation of the circuitry of FIG. 5.
Figure 7:
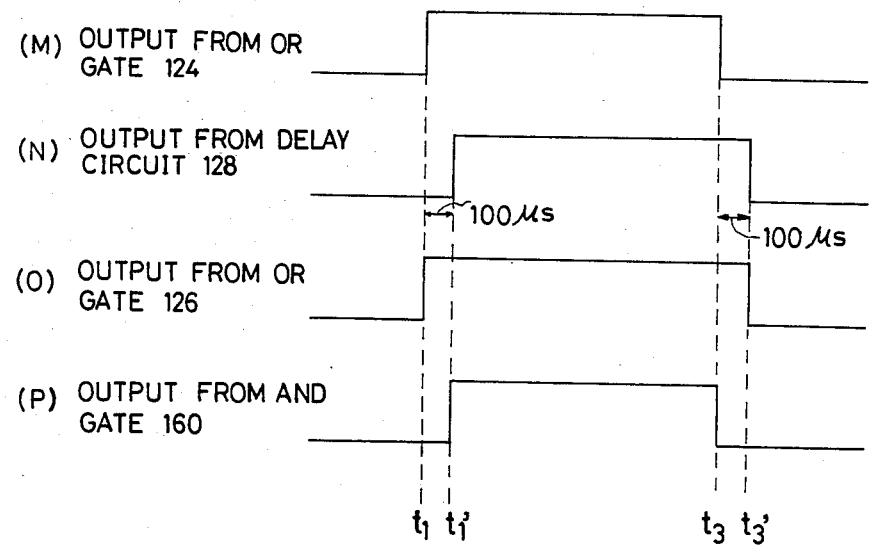
FIG. 7 is also a waveform diagram useful in explaining the operation of the circuitry of FIG. 5.

Whether the FILE PROTECT window 40 of the disk cassette 10 is open or closed must be sensed after the disk cassette is loaded in the FDD 44 and before the "ready" signal, shown at (I) in FIG. 6, from the "ready" sensor circuit 108, FIG. 3, goes high. Toward this end, as shown in FIG. 5, there is provided a disk detector circuit 174 comprising the LED 96 and phototransistor 98, FIG. 3, of the disk detector 94. The disk detector circuit 174 puts out a DISK PRESENCE signal, seen at (F) in FIG. 6, which goes high when the disk cassette 10 is loaded in the FDD 40. We have drawn the waveform of the DISK PRESENCE signal on the assumption that the disk cassette 10 is loaded in the FDD 44 at a moment t4, later than the moment t3 when the output from the OR gate 124 goes low.

The disk detector circuit 174 has its output connected to a delay circuit 176, which imparts an delay T6 of, say, 80 ms, to the DISK PRESENCE signal. Since the DISK PRESENCE signal is assumed to go high at the moment t4, the output from the delay circuit 176 goes high at a moment t5, 80 ms after the moment t4, by which moment the loading of the disk cassette 10 may have been completed in all likelihood.

The delay circuit 176 has its output connected to a timer 178. Triggered by the delay circuit output when it goes high at the moment t5, the timer 178 puts out a pulse of a duration T7 (e.g. 40 ms), as at (J) in FIG. 6. The timer 178 has its output connected to the OR gate 124.

Thus the LEDs 82 and 90 of the TRACK ZERO sensor 80 and FILE PROTECT sensor 88 are reenergized from the moment t5, 80 ms after the DISK PRESENCE signal goes high at the moment t4, to a moment t6, approximately 40 ms after the moment t5. Both TRACK ZERO and FILE PROTECT sensors 80 and 88 again perform their intended functions during this period. In the case now being studied, the disk cassette 10 was not loaded during the previous period (from moment t1 to moment t3 or t3') of energization of the LEDs 82 and 90. The reenergization of the FILE PROTECT sensor LED 90, in particular, from moment t5 to moment t6 is essential for ascertaining whether the FILE PROTECT window 40 is open or closed.

The disk detector circuit 174 has its output connected also to the "set" input S of an RS flip flop 180, which has its "reset" input R connected to the "ready" sensor circuit 108, FIG. 3. The flip flop 180 is therefore set at the moment t4 by the DISK PRESENCE signal from the disk detector circuit 174 and is reset at the moment t9 by the "ready" signal from the "ready" sensor circuit 108. The flip flop 180 has its "Q" output connected to a two input OR gate 182, the other input of which is connected to an input line 184 to receive the standard MOTOR ON signal from the master equipment. As shown at (G) in FIG. 6, the MOTOR ON signal goes high, as at a moment t10, to set the disk drive motor 46 into rotation. The output from the OR gate 182 is therefore as seen at (H) in FIG. 6, going high from moment t4 to moment t9 in response to the "Q" output from the flip flop 180, and at and after the moment t10 in response to the MOTOR ON signal.

The OR gate 182 has its output connected to a disk drive motor circuit 186, which sets the disk drive motor 46 into rotation in response to the high output from the OR gate 182. The disk drive motor 46 rotates from moment t4 to moment t9 and from moment t10 until the MOTOR ON signal goes low. The rotation of the disk drive motor 46 from moment t4 to moment t9, that is, from the moment the disk cassette 10 is loaded in the FDD 44 to the moment the "ready" signal goes high, is intended to establish the driving engagement of the turntable 52 with the hub 34, FIG. 2, of the magnetic disk 12 as soon as possible following the loading of the disk cassette 10.

Contrary to the showing of FIG. 6, the disk cassette 10 may have already been loaded in the FDD 44 when the "power on" signal from the circuit 120 goes high. In that case, too, the disk drive motor 46 is to be set into rotation in response to the "power on" signal for the same purpose as above.

The output of the disk detector circuit 174 is further connected to a two input AND gate 188, the other input of which is connected to the OR gate 182. The output from the AND gate 188 is high, therefore, when the DISK PRESENCE signal at (F) in FIG. 6 is high and, at the same time, when the output from the OR gate 182 at (H) in FIG. 6 is high. In the case represented in FIG. 6, the output from the AND gate 188 is equivalent to the output from the OR gate 182 seen at (H) in FIG. 6.

The AND gate 188 has its output connected to a delay circuit 190, which gives a delay T4 (e.g. 320 ms) to the AND gate output. Connected to the output of the delay circuit 192, a timer 192 puts out a pulse of a duration T5 (e.g. 100 ms) each time the delay circuit output goes high. Thus, as indicated at (K) in FIG. 6, the output from the timer 192 is high from a moment t7 (320 ms after the moment t4) to a moment t8 (100 ms after the moment t7) and from a moment t11 (320 ms after the moment t10) to a moment t12 (100 ms after the moment t11). The timer 192 has its output connected to the OR gate 124.

Consequently, the power saving transistor 110 electrically connects the LEDs 82 and 90 of the TRACK ZERO sensor 80 and FILE PROTECT sensor 88 to the five volt power supply for approximately 100 ms after the moments t7 and t11. This energization of the LEDs 82 and 90 at the moments 320 ms after the disk drive motor 46 is set into rotation is intended for the reconfirmation of whether the FILE PROTECT window 40 is open or closed, after the beginning of the rotation of the magnetic disk 12 and before the commencement of data transfer between the disk and the transducer heads 54.

We have gained the following advantages by our invention as embodied in the FDD of the above described construction and operation:

1. A substantial saving of power is realized as the TRACK ZERO sensor 80 and FILE PROTECT sensor 88 are energized only approximately from moment t1 to moment t3, from moment t5 to moment t6, from moment t7 to moment t8, from moment t11 to moment t12, and from moment t14 to moment t15.

2. The energization of the two sensors 80 and 88 immediately upon closure of the power switch of the data processing system leads to the quick sensing of whether the pair of transducer heads 54 are in the "track zero" position and, if the disk cassette 10 has then been loaded in the FDD 44, of whether or not it is protected against data erasure.

3. The reenergization of the sensors 80 and 88 at the moments (t7 and t11) 320 ms after the disk drive motor 46 has been set into rotation makes possible the resensing of the FILE PROTECT window 40 of the disk cassette 10 being firmly held in the exact data transfer position on the turntable 52.

4. The transducer heads 54 return to the "track zero" position on the magnetic disk 12 as the control and drive circuit 132 energizes the head transport motor in the sequence of the fourth $\phi4$, third $\phi3$, second $\phi2$ and first $\phi1$ phase windings, indicated at (D) in FIG. 6, in response to the stepping signal and stepping direction signal during the period from moment t13 to moment t14. Then, as shown at (E) in FIG. 6, the output from the RMM 140 remains high for 50 ms after the moment t14, with the consequent energization of the LEDs 82 and 90 during that period. The TRACK ZERO sensor 80 can thus detect the return of the transducer heads 54 to the "track zero" position.

5. As set forth in connection with FIG. 7, the sensor output validation circuit 150 functions to validate the outputs from the TRACK ZERO sensor 80 and FILE PROTECT sensor 88 only when the LEDs 82 and 90 are radiating their full energy. Those sensor outputs are cut off which are produced immediately after the beginning of, and toward the end of, each period of energization of the LEDs 82 and 90, as the radiant energy of the LEDs may be unstable at such times.

6. A simpler circuit configuration is realized as the output from the AND gate 138, to which are input input both the stepping signal and the stepping direction signal, for energizing the TRACK ZERO sensor LED 82 after the return of the transducer heads 54 to the "track zero" position in response to the stepping pulses given at (D) in FIG. 6.

7. The serial connection of the TRACK ZERO sensor LED 82 and FILE PROTECT sensor LED 90 simplifies the associated circuitry for their controlled energization and deenergization.

Notwithstanding the above detailed disclosure, we do not wish our invention to be limited by the exact details of this embodiment, as a variety of modifications of the embodiment will readily occur to one skilled in the art within the scope of our invention. The following, then, is a brief list of such possible modifications:

1. The TRACK ZERO sensor LED 82 and FILE PROTECT sensor LED 90 may be separately energized and deenergized as required, the TRACK ZERO sensor LED 82 as dictated by the outputs from the timer 122 and AND gate 138, and the FILE PROTECT sensor LED 90 as dictated by the outputs from the timers 178 and 192.
2. The TRACK ZERO sensor phototransistor 84 and FILE PROTECT sensor phototransistor 92 may be irradiated respectively when the transducer heads 54 are in the "track zero" position and when the disk cassette 10 is protected against erasure.
3. Only either of the timers 178 and 192 may be connected to the OR gate 124.
4. The rotation of the magnetic disk 12 from moment t4 to moment t9 in response to the loading of the disk cassette 10 in the FDD 44 is not a requirement.
5. The light interrupter 86 of the TRACK ZERO sensor 80 may be replaced by a reflector, so arranged that when the transducer heads 54 reach the "track zero" position, the light from the LED 82 will be reflected by the reflector to fall on the phototransistor 84.
6. Our invention is adaptable for a variety of data transfer devices other than the FDD disclosed herein, including those having magnetic disks semipermanently mounted therein, as well as devices for use with a variety of disklike record media other than the flexible magnetic disk cassette disclosed herein.

We claim:

1. A data transfer apparatus for use with a disklike record medium such as a flexible magnetic disk having data storage tracks thereon, the apparatus comprising:
   (a) a disk drive motor for imparting rotation to the loaded record medium;
   (b) a transducer head for data transfer with the record medium;
   (c) a head transport motor for moving the transducer head radially of the record medium so as to enable the transducer head to access the individual data storage tracks on the record medium;
   (d) a sensor including a light source for sensing whether the transducer head is in a preassigned track position on the record medium;
   (e) power supply means;
   (f) a power saving switch connected between the light source of the sensor and the power supply means for allowing the latter to energize the former only when the operation of the sensor is required; and
   (g) a switch control circuit connected to the power saving switch for the on/off control thereof, the switch control circuit being actuated at least when the data transfer apparatus is electrically turned on, for holding the power saving switch closed for a preassigned length of time thereafter.

2. A data transfer apparatus as set forth in claim 1, wherein the switch control circuit comprises:
   (a) a "power on" sensor circuit for sensing the fact that the data transfer apparatus is electrically turned on; and
   (b) a timer responsive to the output from the "power on" sensor circuit for generating a pulse of a predetermined duration when the data transfer apparatus is electrically turned on, the output pulse of the timer being used for closing the power saving switch for the preassigned length of time.

3. A data transfer apparatus as set forth in claim 1, wherein the switch control circuit further comprises:
   (a) a disk detector circuit for sensing the loading of the record medium in the data transfer apparatus; and
   (b) circuit means connected to the disk detector circuit for generating a pulse of a predetermined duration in response to the loading of the record medium in the data transfer apparatus, the output pulse of the circuit means being used for closing the power saving switch for a length of time approximately equal to the predetermined pulse duration.

4. A data transfer apparatus as set forth in claim 1, wherein the disk drive motor is set into and out of rotation by a drive circuit responsive to a "motor on" signal, and wherein the switch control circuit further comprises:
   (a) circuit means connected to input the "motor on" signal for generating a pulse of a predetermined duration in response thereto, the output pulse of the timer being used for closing the power switch for a length of time approximately equal to the predetermined pulse duration after the disk drive motor is set into rotation.

5. A data transfer apparatus as set forth in claim 1, wherein the disk drive motor is set into and out of rotation by a drive circuit responsive to a "motor on" signal, and wherein the switch control circuit further comprises:
   (a) a disk detector circuit for sensing the loading of the record medium in the data transfer apparatus;
   (b) first circuit means connected to the disk detector circuit for generating a pulse of a first predetermined duration upon lapse of a first predetermined length of time following the loading of the record medium in the data transfer apparatus, the output pulse of the first circuit means being used for closing the power saving switch for a length of time approximately equal to the first predetermined pulse duration; and
   (c) second circuit means connected to input the "motor on" signal for generating a pulse of a second predetermined duration upon lapse of a second predetermined length of time, different from the first predetermined length of time, after the disk drive motor is set into rotation, the output pulse of the second circuit means being used for closing the power saving switch for a length of time approximately equal to the second predetermined pulse duration.

6. A data transfer apparatus as set forth in claim 5, further comprising third circuit means connected between the disk detector circuit and the drive circuit for causing the latter to rotate the disk drive motor for a definite length of time following the loading of the record medium in the data transfer apparatus, the second circuit means of the switch control circuit being further connected to the third circuit means for generating a pulse of the second predetermined duration upon lapse of the second predetermined length of time following the loading of the record medium in the data transfer apparatus, whereby the power saving switch is additionally closed for a length of time approximately equal to the second predetermined pulse duration upon lapse of the predetermined length of time after the disk drive motor is set into rotation by the drive circuit in response to the loading of the record medium in the data transfer apparatus.

7. A data transfer apparatus as set forth in claim 1, wherein the head transport motor is a stepping motor controllably driven by a head transport motor control and drive circuit responsive to a stepping signal and a stepping direction signal, and wherein the switch control circuit further comprises:
   (a) circuit means responsive to the stepping signal and the stepping direction signal for generating a pulse of a predetermined duration when the transducer head is moved to the preassigned track position on the record medium, the output pulse of the circuit means being used for closing the power saving switch for a length of time approximately equal to the predetermined pulse duration.

8. A data transfer apparatus as set forth in claim 1, further comprising a sensor output validation circuit connected to both the sensor and the switch control circuit for validating the output from the sensor by allowing the passage therethrough of the sensor output only when the light source of the sensor is being energized from the power supply means via the power saving switch.

9. A data transfer apparatus as set forth in claim 8, wherein the sensor output validation circuit is adapted to allow the passage therethrough of the sensor output from a moment later than the moment the power saving switch is closed to a moment earlier than the moment the power saving switch is opened.

10. A data transfer apparatus for use with a disklike record medium such as a flexible magnetic disk having data storage tracks thereon, the apparatus comprising:
   (a) a disk drive motor for imparting rotation to the loaded record medium;
   (b) a disk drive motor drive circuit for setting the disk drive motor into and out of rotation as dictated by a "motor on" signal;
   (c) a transducer head for data transfer with the record medium;
   (d) a head transport motor for moving the transducer head radially of the record medium so as to enable the transducer head to access the individual data storage tracks on the record medium;
   (e) a head transport motor control and drive circuit for controllably driving the head transport motor;
   (f) a sensor including a light source for sensing whether the transducer head is in a preassigned track position on the record medium;
   (g) power supply means;
   (h) a power saving switch connected between the light source of the sensor and the power supply means for normally holding the former electrically disconnected from the latter;
   (i) a "power on" sensor circuit for sensing the fact that the data transfer apparatus is electrically turned on;
   (j) first timer means responsive to the output from the "power on" sensor circuit for generating a pulse of a first predetermined duration when the data transfer apparatus is electrically turned on, the output pulse of the first timer means being used for closing the power saving switch for a length of time approximately equal to the first predetermined pulse duration;
   (k) second timer means for generating a pulse of a second predetermined duration when the transducer head is moved to the preassigned track position on the record medium by the head transport motor under the control of the head transport motor control and drive circuit, the output pulse of the second timer means being used for closing the power saving switch for a length of time approximately equal to the second predetermined pulse duration following the travel of the transducer head to the preassigned track position on the record medium;
   (l) a disk detector circuit for sensing the loading of the record medium in the data transfer apparatus;
   (m) third timer means connected to the disk detector circuit for generating a pulse of a third predetermined duration in response to the loading of the record medium in the data transfer apparatus, the output pulse of the third timer means being used for closing the power saving switch for a length of time approximately equal to the third predetermined pulse duration; and
   (n) fourth timer means responsive to the "motor on" signal for generating a pulse of a fourth predetermined duration when the disk drive motor is set into rotation by the disk drive motor drive circuit in responsive to the "motor on" signal, the output pulse of the fourth timer means being used for closing the power saving switch for a length of time approximately equal to the fourth predetermined pulse duration.

11. A data transfer apparatus as set forth in claim 10, further comprising a sensor output validation circuit connected to the sensor for allowing the passage therethrough of the sensor output only when the light source of the sensor is being energized from the power supply means by the closure of the power saving switch in response to the output pulses of the first, second, third and fourth timer means.

12. A data transfer apparatus as set forth in claim 11, wherein the sensor output validation circuit is adapted to allow the passage therethrough of the sensor output from a moment later than the moment the power saving switch is closed to a moment earlier than the moment the power saving switch is opened.

13. A data transfer apparatus for use with a replaceable disk cassette or cartridge having a disklike record medium such as a flexible magnetic disk rotatably enclosed in a protective envelope therefor, the record medium having data storage tracks thereon, the apparatus comprising:
   (a) a disk drive motor for imparting rotation to the record medium of the disk cassette or cartridge;
   (b) a transducer head for data transfer with the record medium while the latter is in rotation;
   (c) a head transport motor for moving the transducer head radially of the record medium so as to enable the transducer head to access the individual data storage tracks on the record medium;
   (d) a first sensor including a first light source for sensing whether the transducer head is in a preassigned track position on the record medium;
   (e) a second sensor including a second light source for sensing from a predetermined part of the envelope of the disk cassette or cartridge whether the record medium is protected against the erasure of any data stored thereon, the first and second light sources of the first and second sensors being electrically connected in series with each other;
   (f) power supply means;

(g) a power saving switch connected between the serial connection of the first and second light sources of the first and second sensors and the power supply means for allowing the latter to energize the first and second light sources only when the operation of at least either of the first and second sensors is required; and (h) a switch control circuit connected to the power saving switch for the on/off control thereof, the switch control circuit being actuated at least when the data transfer apparatus is electrically turned on, for holding the power saving switch closed for a preassigned length of time thereafter.

14. A data transfer apparatus as set forth in claim 13, wherein the apparatus has a first supply terminal to receive a first supply voltage, and a second supply terminal to receive a second supply voltage lower than the first supply voltage, and wherein the switch control circuit closes the power saving switch when the first and second supply voltages build up to predetermined percentages thereof after the apparatus is electrically turned on.

15. A data transfer apparatus as set forth in claim 13, wherein the first and second light sources of the first and second sensors are both light emitting diodes.

* * * * *